United States Patent
Chin et al.

(10) Patent No.: US 8,885,605 B2
(45) Date of Patent: Nov. 11, 2014

(54) METHOD AND APPARATUS FOR EXPLICIT SIGNALING OF BATON HANDOVER IN TD-SCDMA SYSTEMS

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 13/510,594

(22) PCT Filed: Apr. 5, 2010

(86) PCT No.: PCT/US2010/029946
§ 371 (c)(1),
(2), (4) Date: Jul. 17, 2012

(87) PCT Pub. No.: WO2011/075181
PCT Pub. Date: Jun. 23, 2011

(65) Prior Publication Data
US 2012/0275433 A1 Nov. 1, 2012

Related U.S. Application Data

(60) Provisional application No. 61/287,323, filed on Dec. 17, 2009.

(51) Int. Cl.
*H04W 4/00* (2009.01)
*H04W 36/00* (2009.01)
*H04W 36/08* (2009.01)

(52) U.S. Cl.
CPC .......... *H04W 36/0005* (2013.01); *H04W 36/08* (2013.01)

USPC .......................................................... 370/331

(58) Field of Classification Search
CPC ...................................... H04W 36/00–36/385
See application file for complete search history.

(56) References Cited

U.S. PATENT DOCUMENTS

| 2002/0057667 A1* | 5/2002 | Hamalainen et al. ......... 370/347 |
| 2003/0076812 A1* | 4/2003 | Benedittis ..................... 370/350 |

(Continued)

FOREIGN PATENT DOCUMENTS

| CN | 1665342 A | 9/2005 |
| CN | 101128064 A | 2/2008 |
| WO | 2005096641 | 10/2005 |

OTHER PUBLICATIONS

TSG-RAN Working Group 2, "Overview of the TDD harmonisation and teh key features of TD-SCDMA", Aug. 15-20, 1999, all pages.*
Huimin, "Introduction of TD-SCDMA", Jun. 15, 2009, all pages.*

(Continued)

*Primary Examiner* — Otis L Thompson, Jr.
(74) *Attorney, Agent, or Firm* — Kristine U. Ekwueme

(57) ABSTRACT

Physical layer bits in a Time Division-Synchronous Code Division Multiple Access (TD-SCDMA) system control a baton handover. A method for enabling a baton handover from a source cell to a target cell includes tuning an uplink from a source channel of the source cell to a target channel of the target cell. The method also includes receiving a physical layer downlink switch command to switch a downlink from the source cell to the target cell. The method further includes tuning the downlink from the source channel of the source cell to the target channel of the target cell, in response to the physical layer downlink switch command, thus implementing the handover from the source cell to the target cell.

16 Claims, 8 Drawing Sheets

(56) References Cited

U.S. PATENT DOCUMENTS

| | | | |
|---|---|---|---|
| 2003/0117980 A1* | 6/2003 | Kim et al. | 370/332 |
| 2005/0272426 A1 | 12/2005 | Yang et al. | |
| 2006/0153105 A1* | 7/2006 | Jia et al. | 370/278 |
| 2009/0005060 A1* | 1/2009 | Mazawa et al. | 455/452.2 |
| 2009/0052398 A1* | 2/2009 | Hofmann | 370/331 |
| 2009/0122730 A1* | 5/2009 | Yang et al. | 370/280 |
| 2009/0310563 A1* | 12/2009 | Chou et al. | 370/331 |
| 2010/0142477 A1* | 6/2010 | Yokota | 370/331 |
| 2010/0232327 A1* | 9/2010 | Kim et al. | 370/311 |
| 2010/0323749 A1* | 12/2010 | Lee et al. | 455/524 |
| 2011/0013595 A1* | 1/2011 | Park et al. | 370/331 |
| 2011/0058529 A1* | 3/2011 | Uemura | 370/331 |
| 2012/0020331 A1* | 1/2012 | Chin et al. | 370/335 |
| 2012/0184278 A1* | 7/2012 | Chin et al. | 455/438 |

OTHER PUBLICATIONS

Chen, H et al., "China's Perspectives on 3G Mobile Communications and Beyond: TDSCDMA Technology", IEEE Personal Communications, IEEE Communications Society, US LNKD-D0I:10.1109/MWC.2002.998525! vol. 9, No. 2, Apr. 1, 2002, pp. 48-59, XP011093854, ISSN: 1070-9916.

Chen, H et al., "China's Perspectives on 3G Mobile Communications and Beyond: TDSCDMA Technology", IEEE Personal Communications, IEEE Communications Society, US LNKD DOI:10.1109/MWC.2002.998525! vol. 9, No. 2, Apr. 1, 2002, pp. 48-59, XP011093854, ISSN: 1070-9916.

International Search Report and Written Opinion—PCT/US2010/029946, International Search Authority—European Patent Office—Sep. 7, 2010.

Taiwan Search Report—TW099110786—TIPO—Nov. 12, 2013.

* cited by examiner

| Slot Format # | Spreading Factor | Midamble length (chips) | $N_{TFCI}$ code word (bits) | $N_{SS}$ & $N_{TPC}$ (bits) | Bits/slot | $N_{data}$/Slot (bits) | $N_{data}$/data field(1) (bits) | $N_{data}$/data field(2) (bits) |
|---|---|---|---|---|---|---|---|---|
| 0 | 16 | 144 | 0 | 0 & 0 | 88 | 88 | 44 | 44 |
| 1 | 16 | 144 | 4 | 0 & 0 | 88 | 86 | 42 | 44 |
| 2 | 16 | 144 | 8 | 0 & 0 | 88 | 84 | 42 | 42 |
| 3 | 16 | 144 | 16 | 0 & 0 | 88 | 80 | 40 | 40 |
| 4 | 16 | 144 | 32 | 0 & 0 | 88 | 72 | 36 | 36 |
| 5 | 16 | 144 | 0 | 2 & 2 | 88 | 84 | 44 | 40 |
| 6 | 16 | 144 | 4 | 2 & 2 | 88 | 82 | 42 | 40 |
| 7 | 16 | 144 | 8 | 2 & 2 | 88 | 80 | 42 | 38 |
| 8 | 16 | 144 | 16 | 2 & 2 | 88 | 76 | 40 | 36 |
| 9 | 16 | 144 | 32 | 2 & 2 | 88 | 68 | 36 | 32 |

FIG. 4

METHOD AND APPARATUS FOR EXPLICIT SIGNALING OF BATON HANDOVER IN TD-SCDMA SYSTEMS

CROSS-REFERENCE TO RELATED APPLICATION

This application claims the benefit of U.S. Provisional Patent Application No. 61/287,323, entitled "METHOD OF EXPLICIT SIGNALING OF BATON HANDOVER IN TD-SCDMA SYSTEMS," and filed on Dec. 17, 2009, which is expressly incorporated by reference herein in its entirety.

BACKGROUND

1. Field

The present disclosure generally relates to wireless communications and, more particularly, to a method and apparatus for utilizing physical layer commands in a Time Division-Synchronous Code Division Multiple Access (TD-SCDMA) baton handover.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UTMS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

According to an aspect of the present disclosure, a method enables a baton handover from a source cell to a target cell. The method includes tuning an uplink from a source channel of the source cell to a target channel of the target cell. The method also includes receiving a physical layer downlink switch command to switch a downlink from the source cell to the target cell. The method further includes tuning the downlink from the source channel of the source cell to the target channel of the target cell, in response to the physical layer downlink switch command, implementing the handover from the source cell to the target cell.

In another aspect, a method enables a baton handover from a source cell to a target cell. The method includes tuning an uplink from a source channel of the source cell to a target channel of the target cell. The method also includes transmitting a physical layer downlink switch command to switch a downlink from the source cell to the target cell. The method further includes tuning the downlink from the source channel of the source cell to the target channel of the target cell, in accordance with the physical layer downlink switch command, implementing the handover from the source cell to the target cell.

In still another aspect, a computer readable medium tangibly stores a computer program for enabling a baton handover from a source cell to a target cell. The medium includes an uplink tuning code segment that tunes an uplink from a source channel of the source cell to a target channel of the target cell. The medium also includes a physical layer downlink switch command processing code segment that receives a network initiated physical layer downlink switch command to switch a downlink from the source cell to the target cell. The physical layer downlink switch command processing code segment also transmits a user equipment initiated physical layer downlink switch command to switch the downlink from the source cell to the target cell. The medium further includes a downlink tuning code segment that tunes the downlink from the source channel of the source cell to the target channel of the target cell, in response to the physical layer downlink switch command, implementing the handover from the source cell to the target cell.

In yet another aspect, an apparatus enables a baton handover from a source cell to a target cell. The apparatus includes an uplink tuning means for tuning an uplink from a source channel of the source cell to a target channel of the target cell. The apparatus also includes a physical layer downlink switch command processing means for receiving a network initiated physical layer downlink switch command to switch a downlink from the source cell to the target cell, and transmitting a user equipment initiated physical layer downlink switch command to switch the downlink from the source cell to the target cell. The method further includes a downlink tuning means for tuning the downlink from the source channel of the source cell to the target channel of the target cell, in response to the physical layer downlink switch command, implementing the handover from the source cell to the target cell.

In still another aspect, a user equipment device enables a baton handover from a source cell to a target cell. The device has at least one processor configured to tune an uplink from a source channel of the source cell to a target channel of the target cell. The processor(s) is also configured to receive a network initiated physical layer downlink switch command to switch a downlink from the source cell to the target cell, and to transmit a user equipment initiated physical layer downlink switch command to switch the downlink from the source cell to the target cell. The processor(s) is further configured to tune the downlink from the source channel of the source cell to the target channel of the target cell, in response to the physical layer downlink switch command, implementing the handover from the source cell to the target cell. The device also includes a memory coupled to the processor(s).

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects.

FIG. 4 is a table illustrating example bit allocations for both downlink and uplink TD-SCDMA transmissions.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
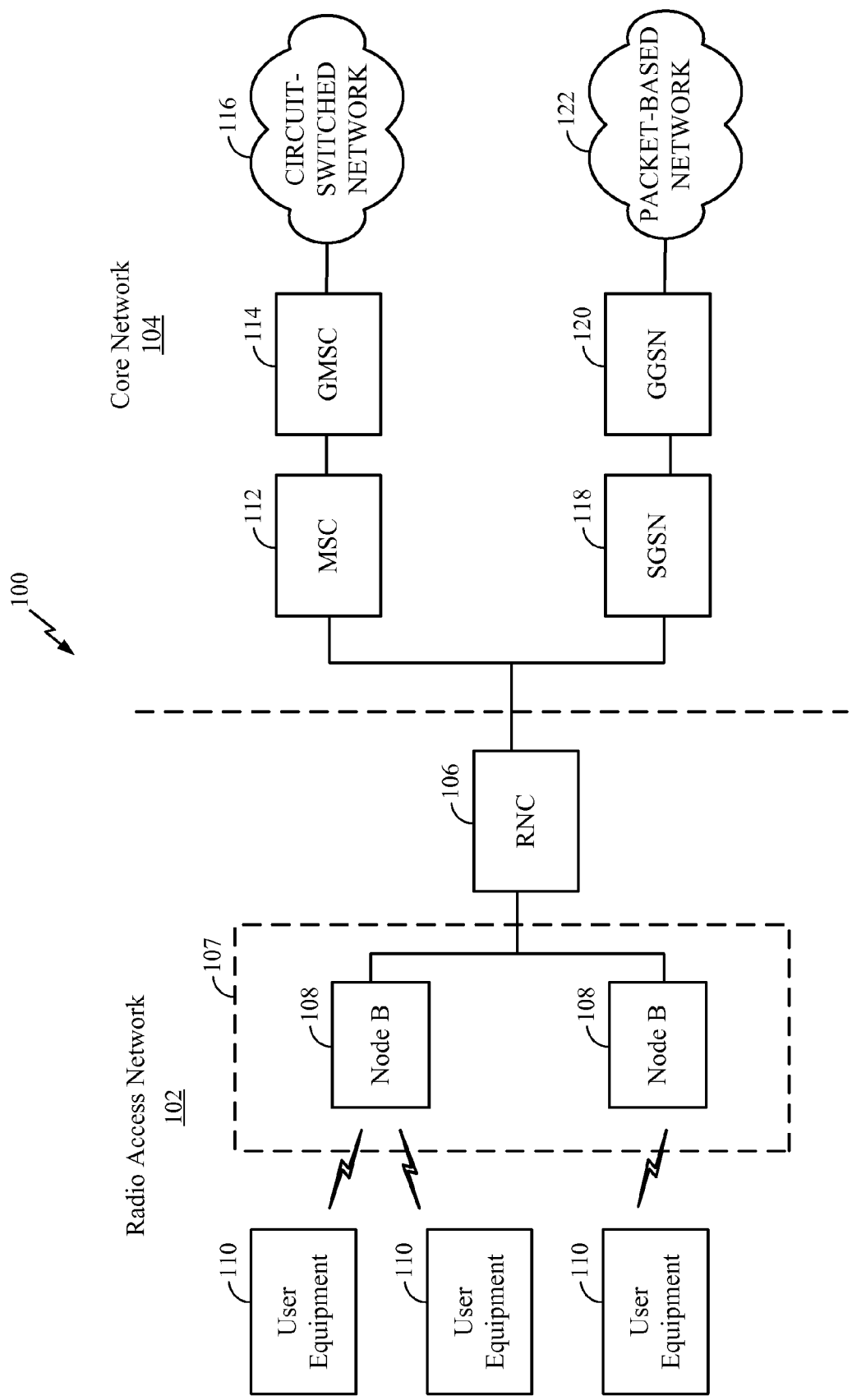
FIG. 1 is a block diagram illustrating an example telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
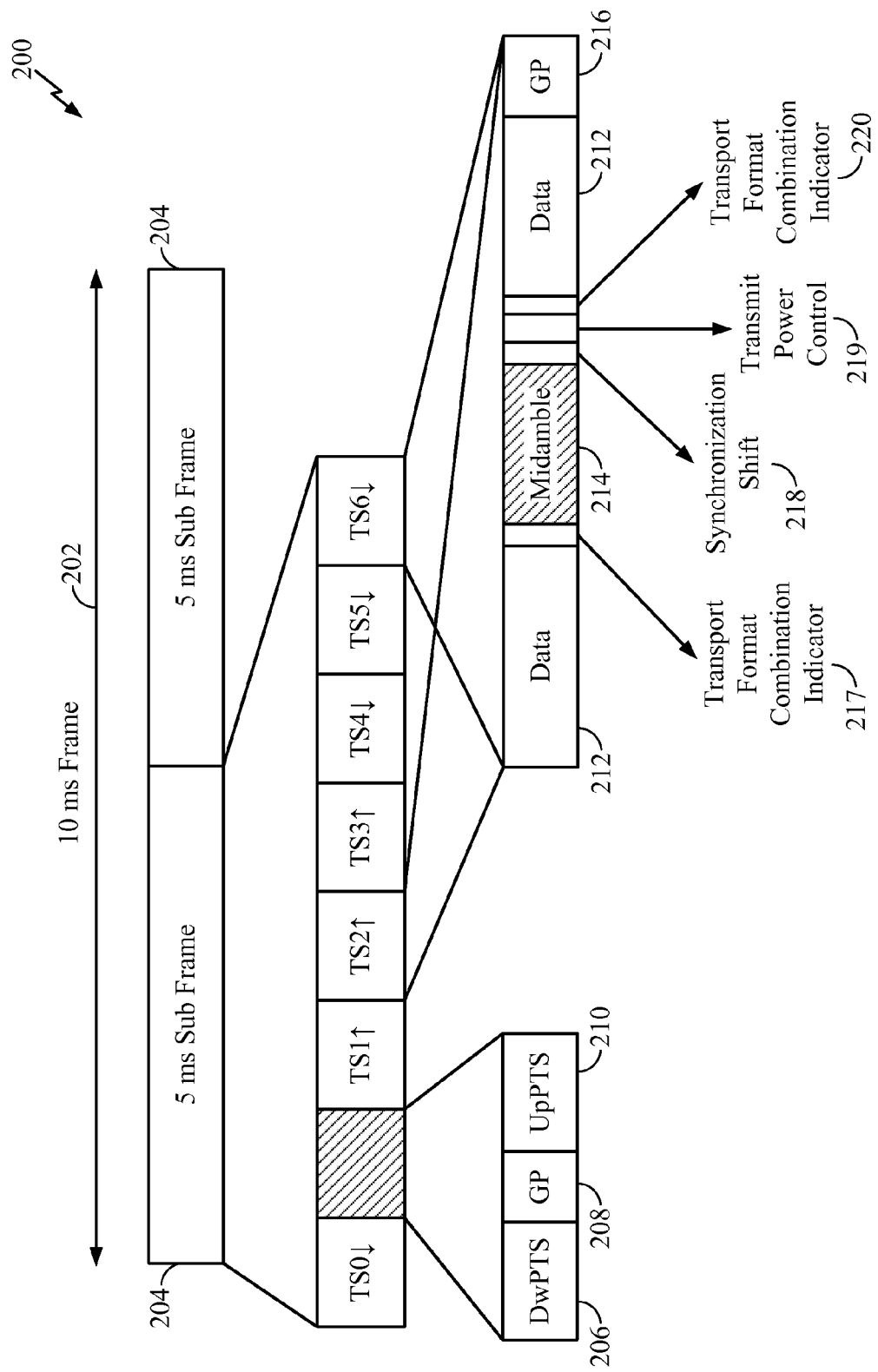
FIG. 2 is a frame structure for a TD-SCDMA carrier.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

The data portion 212 may comprise Layer 1 control information, including a Synchronization Shift (SS) field 218, a Transmit Power Control (TPC) field 219, and Transport Format Combination Indicator (TFCI) fields 217 and 220. The SS field 218 and the TPC field 219 may only appear in the second data portion 212. One of the TFCI fields 217 and 220 may also precede the mid-amble 214. The TFCI fields 217 and 220 may indicate the format of a Coded Composite Transport Channel (CCTrCH). The TPC 219 may indicate up or down transmit power command to a receiving node.

The SS command found in the SS field 218 is a synchronization command issued from the Node B to synchronize the user equipment with the Node B. In a TD-SCDMA system, the user equipment are intended to synchronize to the Node B. The command bits in the SS field 218 immediately following the mid-amble 214 may indicate three possible cases: delayed, advanced, or "do nothing" in the uplink transmission timing. Because the SS command bits are only intended to deliver an instruction from the Node B to the user equipment, they are not defined for uplink transmission from the user equipment to the Node B. However, the SS field 218 with its SS command bits are still present in the uplink transmission for the purpose of having the same formats for downlink and uplink transmissions.

Figure 3:
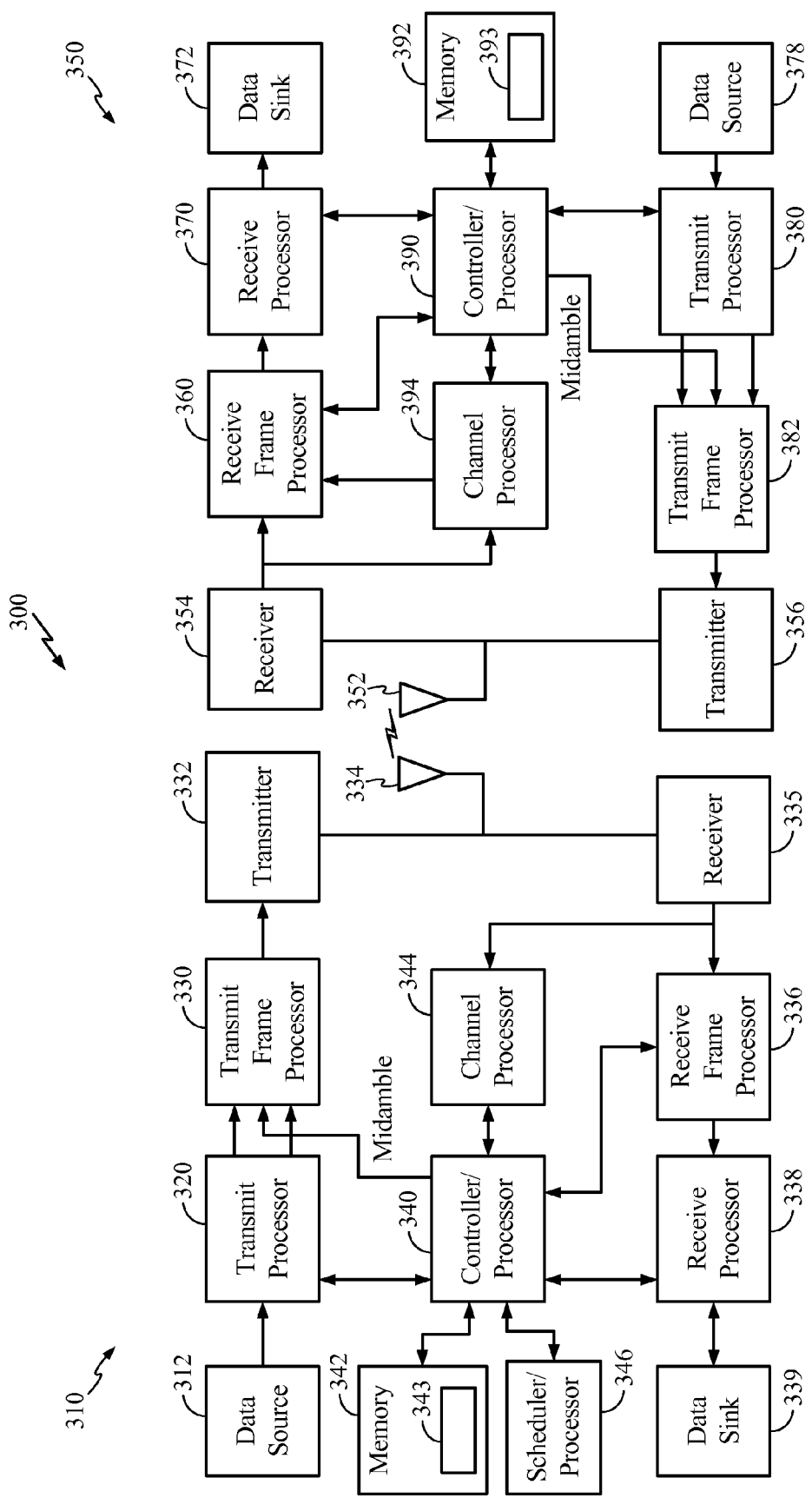
FIG. 3 is a block diagram of a Node B in communication with user equipment in an example telecommunications system.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

FIG. 4 is a table 40 illustrating example bit allocations for both downlink and uplink TD-SCDMA transmissions, particularly for the voice service in which the spreading factor (SF) of 16 may be applied. It can be observed that the SS command bits may be allocated in both uplink and downlink time slots. The TD-SCDMA standards provide for such allocation of space for SS command bits in both transmission directions in order to maintain a symmetric format between downlink and uplink transmissions. However, user equipment is currently not defined to transmit SS command bits to the Node B because the Node B downlink transmission should generally be synchronous with its own timing.

The TD-SCDMA system supports two types of handover: hard handover and baton handover. In hard handover, the user equipment changes both downlink and uplink channels from a source cell to a target cell at one time. Before the user equipment can establish a DPCH (Dedicated Physical Channel), the user equipment performs the UL synchronization procedures on the UpPTS by sending a SYNC_UL code and receive the timing correction and power level command on the FPACH (Fast Physical Access Channel).

Figure 5C:
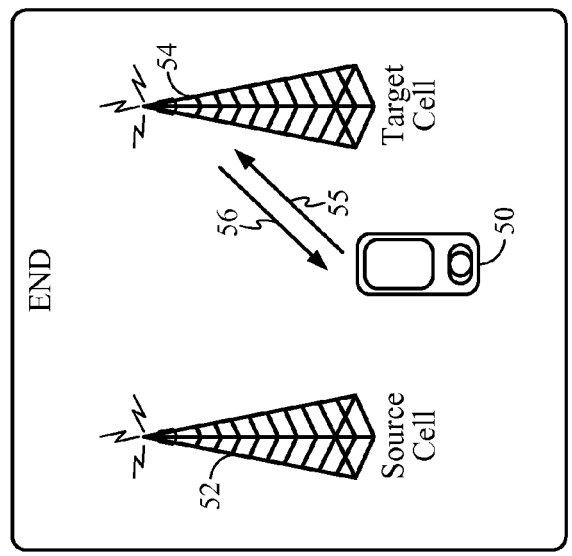
FIGS. 5A-5C illustrate a baton handover in 'before,' 'start' and 'end' stages.
Figure 5B:
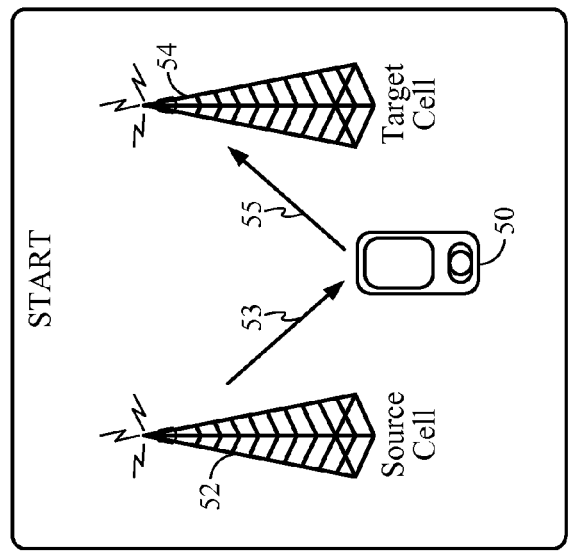
Figure 5A:
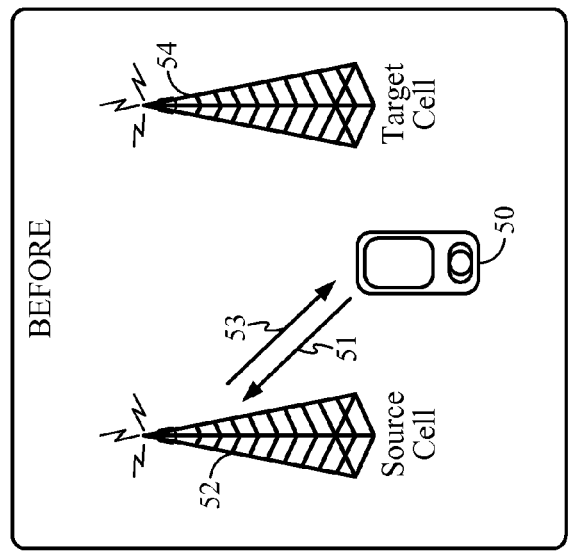

FIGS. 5A-5C illustrate a baton handover in 'before,' 'start' and 'end' stages. In a baton handover, the user equipment 50 first switches an uplink 51 with a source cell 52 to an uplink 55 with a target cell 54. After receiving the uplink 55, the target cell 54 begins preparation for handling communication with the user equipment 50. Once the uplink 55 is properly operating and the target cell 54 has made the preparation for the user equipment 50, the user equipment 50 switches a downlink 53 from the source cell 52 to a downlink 56 from the target cell 54. The two steps in baton handover allow the target cell 54 to acquire the uplink 55, measure timing and power and configure beam forming before the user equipment 50 switches the downlink 53. The baton handover is less disruptive and saves resources over the hard handover. Therefore, baton handover is one of the interesting features of the TD-SCDMA system.

It should be noted that the network can send a PHYSICAL CHANNEL RECONFIGURATION message to the user equipment 50 to initiate transition from Before to Start stages. However, it may require explicit indication to allow the network to command the user equipment 50 to switch the downlink 53 from the source cell 52 to the downlink 56 from the target cell 54. Alternatively, it may require the user equipment 50 to signal to the network that the user equipment 50 has switched the downlink 53 from the source cell 52 to the downlink 56 from the target cell 54.

Certain aspects of the present disclosure enable explicit signaling between user equipment and a network in baton handovers. The signaling facilitates switching of the downlink during the transition time of the baton handover.

In one aspect of the present disclosure, synchronization shift (SS) command bits (SS bits) are employed to control the downlink switching. The SS bits are generally not used during this transition time. Therefore, they are a good physical layer command to use for the various aspects of the present disclosure. The downlink SS bits are determined by a target cell and would be forwarded to the source cell during the transition time (i.e., start stage). The source cell would then transmit those SS bits to the user equipment. Generally, there is no forwarding mechanism between source and target cells. Moreover, uplink SS bits are not defined in TD-SCDMA systems because the base station downlink signals should already be synchronized with the base station that is transmitting them.

Accordingly, in an aspect of the present disclosure, SS bits are employed to control the downlink switch. The SS bits are coded as follows:

TABLE 1

| SS Bits | SS command | Meaning |
| --- | --- | --- |
| 00 | 'Down' | Decrease synchronisation shift |
| 11 | 'Up' | Increase synchronisation shift |
| 01 | 'Do nothing' | No change |
| 10 | 'Switch DL' | Switch DL in baton handover |

As can be seen from Table 1, the SS bits 10 correspond to the command "switch downlink," meaning the downlink is switched in the baton handover. The SS bits 00, 11, and 01 correspond to the normal SS bits used by a base station to synchronize user equipment uplink timing.

Although this description is with respect to SS bits to control the downlink switch, it is contemplated that other physical layer commands can be employed for such a purpose. For example, transmit power control (TPC) bits could alternatively be used.

Figure 6:
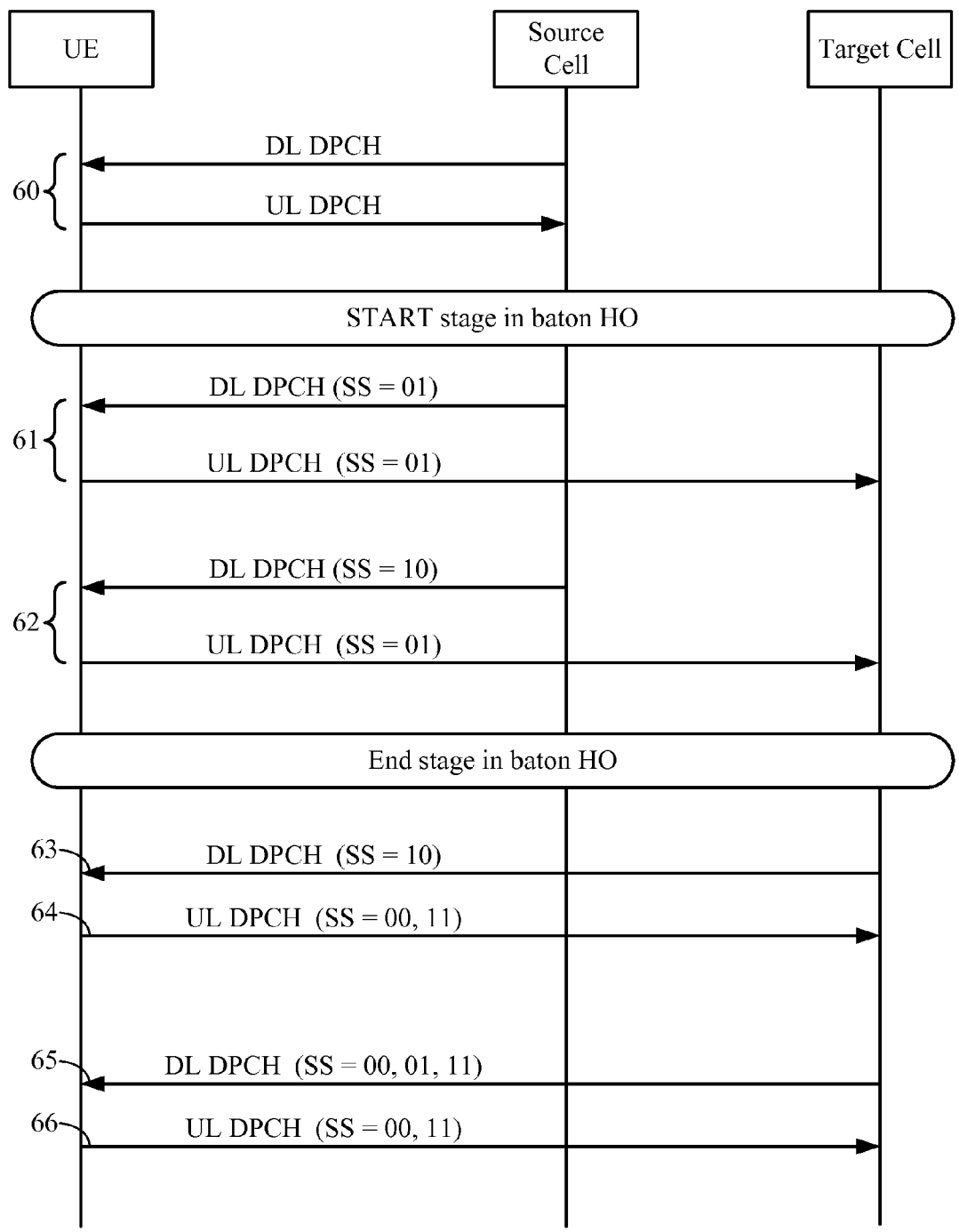
FIG. 6 is a signal diagram illustrating an example in which a network initiates the downlink switch of the baton handover.

Referring now to FIG. 6, an example in which a network initiates the downlink switch of the baton handover will be described. Prior to the start stage in the baton handover, at time 60 both the downlink dedicated physical channel (DPCH) and the uplink DPCH couple the user equipment to the source cell. During the start stage in the baton handover, at time 61 both the user equipment and the source cell transmit SS bits 01, indicating do nothing. At time 61, the downlink DPCH is active between the user equipment and the source cell, whereas the uplink DPCH is active between the user equipment and the target cell. At time 62, the source cell transmits SS bits 10 to the user equipment, indicating to the user equipment that the downlink should be switched. The user equipment transmits the SS bits 01 on the uplink to the target cell indicating to do nothing.

During the end stage in the baton handover, in response to receiving the switch downlink command (bits 10) from the source cell, the user equipment switches the downlink DPCH from the source cell to the target cell at time 63. The target cell at this time will transmit the switch downlink command (10) to the user equipment. At time 64, the user equipment transmits the SS bits 00 or 11 on the uplink. Although SS bits are not generally defined for the user equipment to transmit on the uplink, in this example, the uplink transmission functions as an acknowledgement that the switch downlink command has been received and that the downlink has been switched from the source cell to the target cell. At time 65, the target cell transmits normal SS values, i.e., 00, 01, or 11. These normal values also function as an acknowledgement of the downlink transition from the source cell to the target cell. At times 66, the user equipment again acknowledges by transmitting SS bits 00 or 11. Normal uplink synchronization control then resumes.

Figure 7:
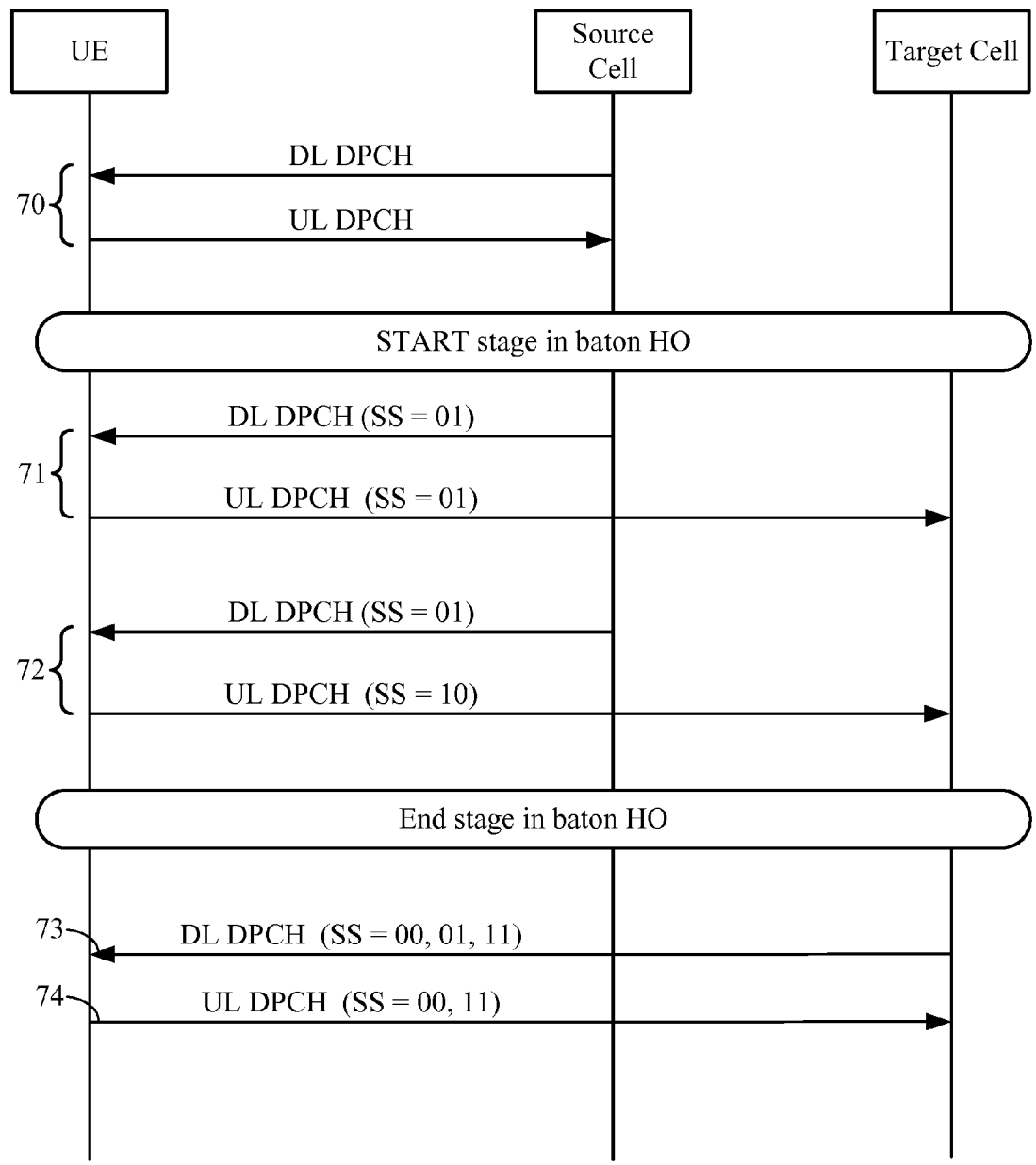
FIG. 7 is a signal diagram illustrating an example of a user equipment-triggered switch.

An example of a user equipment-triggered switch will now be described with respect to FIG. 7. At time 70, the user equipment and the source cell communicate via both the downlink and uplink DPCH. During the start stage, at time 71, the user equipment transmits the do nothing command to the target cell on the uplink, while the source cell transmits the do nothing command on the downlink. At time 72, the user equipment transmits the switch downlink command to the target cell. The source cell continues transmitting the do nothing command on the downlink to the user equipment. In response to the user equipment sending the switch downlink command, the network switches the downlink to the target cell, commencing the end stage in the baton handover. Similar to the network-trigger example aspect described above, with respect to FIG. 6, in the user equipment-triggered example, the target cell acknowledges the switch with normal SS values (at time 73), while the user equipment acknowledges the switch with the SS values 00 or 11 (at time 74). As noted above, transmission of particular SS bits by the user equipment is not generally defined in TD-SCDMA, however, in this instance the commands function as an acknowledgement. Normal uplink synchronization control then resumes.

Thus, the present disclosure provides explicit signaling to facilitate baton handover. The explicit signaling improves the response time and reliability of the baton handover while reusing existing level 1 (physical layer) control information bits.

Figure 8:
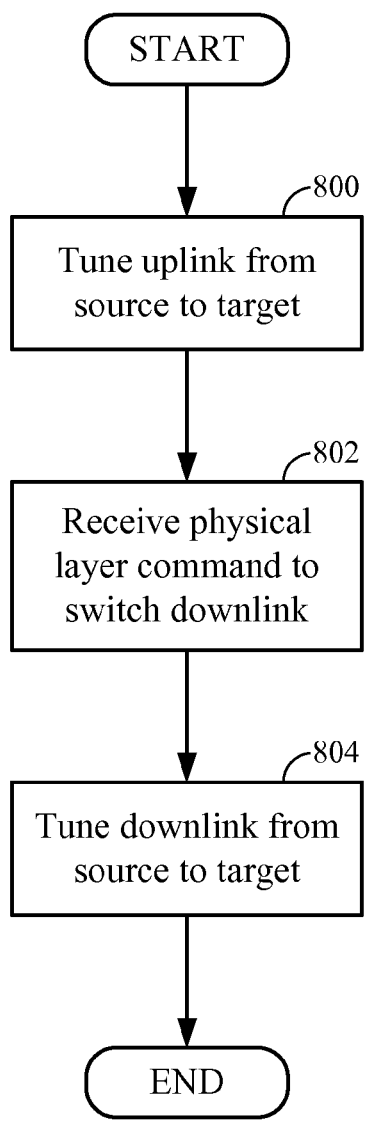
FIG. 8 is an exemplary functional block diagram illustrating example blocks executed to implement one aspect of the present teachings.

Referring now to FIG. 8, an exemplary process block diagram for a network-initiated switch will be described. Initially, at block 800, the user equipment tunes the uplink from a source channel of a source cell to a target channel of a target cell. At block 802, a physical layer downlink switch command is received at the user equipment. The command requests a switch from the source cell to the target cell. At block 804, the user equipment tunes a downlink from the source channel of the source cell to the target channel of the target cell, in response to the physical layer command. Thus, the handover from the source cell to the target cell is implemented.

Figure 9:
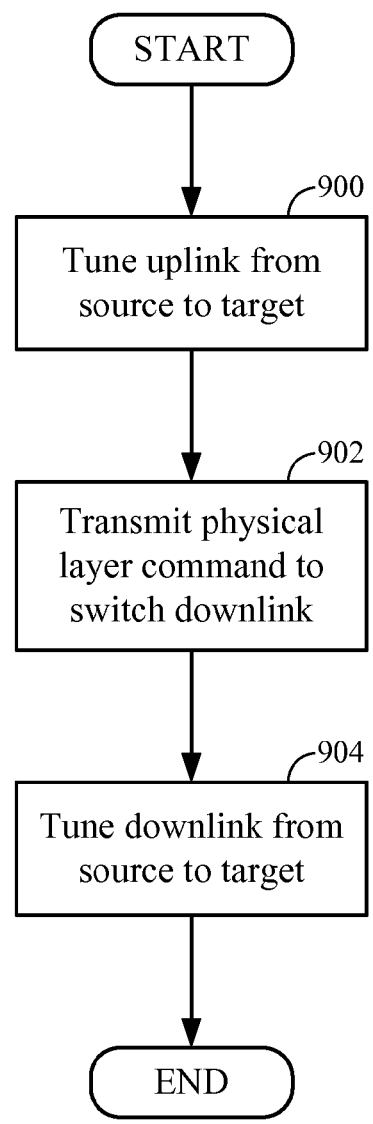
FIG. 9 is an exemplary functional block diagram illustrating example blocks executed to implement one aspect of the present teachings.

An exemplary process block diagram for executing a user equipment-initiated downlink switch will now be described with respect to FIG. 9. Initially, at block 900, the user equipment tunes an uplink signal from a source channel of a source cell to a target channel of a target cell. At block 902, the user equipment transmits a physical layer downlink switch command to switch from the source cell to the target cell. After the network completes its processing for the downlink switch, at block 904, the user equipment tunes a downlink signal from the source channel of the source cell to the target channel of the target cell. Thus, the handover from the source cell to the target cell is implemented.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering.

Turning back to FIG. 3, in one configuration, an apparatus includes an uplink tuning means for tuning an uplink from a source channel of the source cell to a target channel of the target cell. In one aspect, the aforementioned means may be the downlink command switching module 393 stored on the memory 392 and executed by the controller/processor 390. The executing downlink command switching module 393 would notify the transmit processor 380, transmit frame processor 382, and transmitter 356 to tune an uplink signal from the source channel to the target channel. The apparatus of this configuration also includes a physical layer downlink switch command processing means for receiving a network initiated physical layer downlink switch command to switch a downlink from the source cell to the target cell, and transmit a user equipment initiated physical layer downlink switch command to switch the downlink from the source cell to the target cell. In one aspect, the aforementioned means may be the executing downlink command switching module 393 along with the smart antennas 352, the receiver 354, the channel processor 394, and the controller/processor 390 in receiving the network initiated physical layer downlink switch command, and the transmit processor 380, the transmit frame processor 382, transmitter 356, and smart antennas 352 for transmitting a physical layer downlink switch command to switch the downlink from the source cell to the target cell. The apparatus of this configuration also includes a downlink tuning means for tuning the downlink from the source channel of the source cell to the target channel of the target cell, in response to the physical layer downlink switch command, to implement the handover from the source cell to the target cell. In one aspect, the aforementioned means may be the executing downlink command switching module 393 along with the channel processor 394, the receiver 354, and the smart antennas 352, which may tune to receive the downlink signals from the target channel.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Several aspects of a telecommunications system has been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

The executable functional blocks of a method or algorithm described in connection with the present disclosure, such as those described with respect to FIGS. 8 and 9, may be embodied directly in hardware, in a software module executed by a processor, or in a combination of the two. A software module may reside in any form of storage medium that is known in the art. For example, the memory 392 of mobile device 350 stores a downlink switching command module 393. When executed by the controller/processor 390, the program code of the downlink switching command module 393 configures the mobile device 350 to perform the functions described in FIGS. 8 and 9, along with the other functionalities described herein for mobile devices or other user equipment. Additionally, the memory 342 of the base station 310 stores a downlink switching command module 343. When executed by the controller/processor 340, the program code of the downlink switching command module 343 configures the base station 310 to perform the functions described in FIGS. 8 and 9, along with the other functionalities described herein for base stations or Node Bs.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for enabling a baton handover from a source cell to a target cell, comprising:
tuning an uplink from a source channel of the source cell to a target channel of the target cell;
receiving a physical layer downlink switch command to switch a downlink from the source cell to the target cell, wherein the physical layer downlink switch command comprises synchronization shift (SS) bits; and tuning the downlink from the source channel of the source cell to the target channel of the target cell, in response to the physical layer downlink switch command, implementing the handover from the source cell to the target cell.

2. The method of claim 1, wherein the SS bits comprise at least one unused bit sequence.

3. The method of claim 1, further comprising transmitting a physical layer acknowledgment message, after tuning the downlink from the source channel.

4. The method of claim 3, further comprising receiving physical layer signaling commands from the target cell.

5. A method for enabling a baton handover from a source cell to a target cell, comprising:

tuning an uplink from a source channel of the source cell to a target channel of the target cell;

transmitting a physical layer downlink switch command to switch a downlink from the source cell to the target cell, wherein the physical layer downlink switch command comprises synchronization shift (SS) bits; and tuning the downlink from the source channel of the source cell to the target channel of the target cell, in accordance with the physical layer downlink switch command, implementing the handover from the source cell to the target cell.

6. The method of claim 5, wherein the SS bits comprise an unused bit sequence.

7. The method of claim 5, further comprising transmitting a physical layer acknowledgment message, after tuning the downlink from the source channel.

8. The method of claim 7, further comprising receiving physical layer signaling commands from the target cell.

9. A computer readable medium tangibly storing a computer program for enabling a baton handover from a source cell to a target cell, comprising:

an uplink tuning code segment that tunes an uplink from a source channel of the source cell to a target channel of the target cell;

a physical layer downlink switch command processing code segment that receives a network initiated physical layer downlink switch command to switch a downlink from the source cell to the target cell, and transmits a user equipment initiated physical layer downlink switch command to switch the downlink from the source cell to the target cell, wherein the physical layer downlink switch command comprises synchronization shift (SS) bits; and a downlink tuning code segment that tunes the downlink from the source channel of the source cell to the target channel of the target cell, in response to the physical layer downlink switch command, implementing the handover from the source cell to the target cell.

10. The computer readable medium of claim 9, wherein the SS bits comprise an unused bit sequence.

11. The computer readable medium of claim 9, further comprising an acknowledgement code segment that transmits a physical layer acknowledgment message, after tuning the downlink from the source channel.

12. The computer readable medium of claim 11, further comprising a command receiving code segment that receives physical layer signaling commands from the target cell.

13. An apparatus for enabling a baton handover from a source cell to a target cell, comprising:

an uplink tuning means for tuning an uplink from a source channel of the source cell to a target channel of the target cell;

a physical layer downlink switch command processing means for receiving a network initiated physical layer downlink switch command to switch a downlink from the source cell to the target cell, and transmitting a user equipment initiated physical layer downlink switch command to switch the downlink from the source cell to the target cell, wherein the physical layer downlink switch command comprises synchronization shift (SS) bits; and a downlink tuning means for tuning the downlink from the source channel of the source cell to the target channel of the target cell, in response to the physical layer downlink switch command, implementing the handover from the source cell to the target cell.

14. A user equipment for enabling a baton handover from a source cell to a target cell, comprising:

at least one processor configured:
  to tune an uplink from a source channel of the source cell to a target channel of the target cell;
  to receive a network initiated physical layer downlink switch command to switch a downlink from the source cell to the target cell, and to transmit a user equipment initiated physical layer downlink switch command to switch the downlink from the source cell to the target cell, wherein the physical layer downlink switch command comprises synchronization shift (SS) bits; and
  to tune the downlink from the source channel of the source cell to the target channel of the target cell, in response to the physical layer downlink switch command, implementing the handover from the source cell to the target cell; and a memory coupled to the at least one processor.

15. The user equipment of claim 14, comprising a Time Division-Synchronous Code Division Multiple Access (TD-SCDMA) device.

16. The user equipment of claim 14, wherein the at least one processor is further configured to transmit a physical layer acknowledgement message, after turning the downlink from the source channel.

* * * * *